3,418,345
HALONITROANILIDES
Joseph W. Baker, Kirkwood, Mo., assignor to Monsanto Company, St. Louis, Mo., a corporation of Delaware
No Drawing. Filed Oct. 18, 1965, Ser. No. 497,471
2 Claims. (Cl. 260—404.5)

This invention relates to a novel class of organic chemical compositions of matter. More particularly, this invention is concerned with certain new compounds which are anilides containing both the nitro and halogen groups as substituents on the aniline nucleus. The aforesaid halonitroanilides have been found to possess useful and unexpected microbiological activity.

The novel anilides of this invention are those of the formula

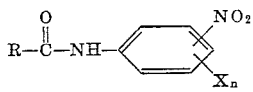

wherein: R is selected from the group consisting of straight chain alkyl and alkenyl of from 4 to 12 carbon atoms, branched chain alkyl and alkenyl of from 5 to 12 carbon atoms, mono- and dihalogenated straight and branched chain alkyl and alkenyl as defined above wherein the halogen is selected from the group consisting of chlorine and bromine, and cycloalkyl of from 4 to 6 carbon atoms; provided however that when the carbon atom of R which is directly attached to the carbonyl group of the anilide is a tertiary carbon atom, then R must contain a total of at least 10 carbon atoms; $n$ is an integer from 1 to 2; X is halogen; and the aniline nucleus is free of ortho substituents.

The novel anilides of this invention can be readily prepared by a number of different methods. Generally, one such method comprises the addition of an appropriate acid chloride to a stirred refluxing solution of the aniline in toluene or methylcyclohexane or in a mixture of the two. Heating of the resulting solution is continued until the evolution of hydrogen chloride ceases. The desired product is then obtained either by cooling the solution and allowing said product to precipitate or by removing the solvent with a rotary evaporator and recovering the product as a residue.

An alternative procedure involves the addition of the acid chloride to a stirred solution of the aniline and triethylamine in ethyl ether. Other tertiary amines can also be employed. Such amines serve as hydrohalide acceptors in a manner well known to the art. The resulting solution is heated for several hours and then cooled. The insoluble triethylamine hydrochloride is removed by filtration after which the solvent is removed with a rotary evaporator. In each of the above described procedures, the desired product is generally purified by recrystallization from an appropriate solvent. Said product can also be treated with activated carbon, as a melt or in solution, which serves to remove undesirable color therefrom.

The invention will be more fully understood by reference to the following examples. These examples, however, are given for the purpose of illustration only and are not to be construed as limiting the scope of the present invention in any manner.

EXAMPLE 1

A suitable reaction vessel is charged with a solution of 8.6 grams (0.05 mole) of 3-chloro-4-nitroaniline in 200 ml. of methylcyclohexane. The solution is stirred and heated at reflux temperature while 7.4 grams (0.055 mole) of hexanoyl chloride is slowly added. The resultant solution is maintained at reflux temperature until the evolution of hydrogen chloride ceases. The solvent is removed by evaporation, and the residue is filtered through Attapulgus clay. There is obtained 3'-chloro-4'-nitrohexananilide, M.P. 40–42° C. Analysis shows 13.2% chlorine as against a calculated value of 13.1% for $C_{12}H_{15}ClN_2O_3$.

EXAMPLE 2

A suitable reaction vessel is charged with a solution of 8.6 grams (0.05 mole) of 3-chloro-4-nitroaniline in 200 ml. of methylcyclohexane. The solution is stirred and heated at reflux temperature while 7.4 grams (0.055 mole) of 4-methylvaleryl chloride is slowly added. The resultant solution is maintained at reflux temperature until the evolution of hydrogen chloride ceases. The solution is then cooled, and the product which precipitates is recrystallized from a toluene-methylcyclohexane mixture. There is obtained 3'-chloro-4-methyl-4'-nitropentananilide, M.P. 81–83° C. Analysis shows 13.0% chlorine as against a calculated value of 13.1% for $C_{12}H_{15}ClN_2O_3$.

EXAMPLE 3

A suitable reaction vessel is charged with a solution of 8.6 grams (0.05 mole) of 3-chloro-4-nitroaniline in 200 ml. of toluene. The solution is stirred and heated at reflux temperature while a solution of 7.3 grams (0.05 mole) of heptanoyl chloride in 50 ml. of toluene is slowly added. The resultant solution is maintained at reflux temperature until the evolution of hydrogen chloride ceases. The solution is then cooled, and the product which precipitates is recrystallized from toluene. There is obtained 3'-chloro-4'-nitroheptananilide, M.P. 55–56° C. Analysis shows 12.6% chlorine as against a calculated value of 12.5% for $C_{13}H_{17}ClN_2O_3$.

EXAMPLE 4

A suitable reaction vessel is charged with a solution of 8.6 grams (0.05 mole) of 3-chloro-4-nitroaniline in 150 ml. of methylcyclohexane. The solution is stirred and heated at reflux temperature while 9.0 grams (0.055 mole) of octanoyl chloride is slowly added. The resultant solution is maintained at reflux temperature until the evolution of hydrogen chloride ceases. The solution is then cooled, and the product which precipitates is recrystallized from a toluene-methylcyclohexane mixture. There is obtained 3'-chloro-4'-nitrooctananilide, M.P. 70–71° C. Analysis shows 12.2% chlorine as against a calculated value of 11.9% for $C_{14}H_{19}ClN_2O_3$.

EXAMPLE 5

A suitable reaction vessel is charged with a solution of 8.6 grams (0.05 mole) of 3-chloro-4-nitroaniline in 300 ml. of a toluene-methylcyclohexane mixture. The solution is stirred and heated at reflux temperature while 10.0 grams (0.05 mole) of decanoyl chloride is slowly added. The resultant solution is maintained at reflux temperature until the evolution of hydrogen chloride ceases. The solvent is removed by evaporation, and the residue is recrystallized from a toluene-Skellysolve B[1] mixture. There is obtained 3'-chloro-4'-nitrodecananilide, M.P. 65–66° C. Analysis shows 11.2% chlorine as against a calculated value of 10.8% for $C_{16}H_{23}ClN_2O_3$.

EXAMPLE 6

A suitable reaction vessel is charged with a solution of 8.6 grams (0.05 mole) of 3-chloro-4-nitroaniline in 150 ml. of methylcyclohexane. The solution is stirred and heated at reflux temperature while a solution of 11.3 grams (0.055 mole) of undecanoyl chloride in 10 ml. of methylcyclohexane is slowly added. The resultant solution is maintained at reflux temperature until the evolution of hydrogen chloride ceases. The solution is then cooled, and the product which precipitates is recrystallized from methylcyclohexane. There is obtained 3'-chloro-4'-nitro-undecananilide, M.P. 69–71° C. Analysis shows 10.5% chlorine as against a calculated value of 10.4% for $C_{17}H_{25}ClN_2O_3$.

EXAMPLE 7

A suitable reaction vessel is charged with a solution of 4.4 grams (0.025 mole) of 3-chloro-4-nitroaniline in 200 ml. of a toluene-methylcyclohexane mixture. The solution is stirred and heated at reflux temperature while 6.3 grams (0.027 mole) of tridecanoyl chloride is slowly added. The resultant solution is maintained at reflux tempearture until the evolution of hydrogen chloride ceases. The solution is then cooled, and the product which precipitates is recrystallized from toluene. There is obtained 3'-chloro-4'-nitrotridecananilide, M.P. 73–75° C. Analysis shows 9.70% chlorine as against a calculated value of 9.61% for $C_{19}H_{29}ClN_2O_3$.

EXAMPLE 8

A suitable reaction vessel is charged with a solution of 3.45 grams (0.02 mole) of 3-chloro-4-nitroaniline in 100 ml. of toluene. The solution is stirred and heated at reflux temperature while 4.2 grams (0.02 mole) of 2-chlorononanoyl chloride is slowly added. The resultant solution is maintained at reflux temperature until the evolution of hydrogen chloride ceases. The solvent is removed by evaporation, and the residue is recrystallized from methylcyclohexane. There is obtained 2,3'-dichloro-4'-nitrononananilide, M.P. 91–92° C. Analysis shows 20.3% chlorine as against a calculated value of 20.5% for $C_{15}H_{20}Cl_2N_2O_3$.

EXAMPLE 9

A suitable reaction vessel is charged with a solution of 3.5 grams (0.02 mole) of 3-chloro-4-nitroaniline in 100 ml. of toluene. The solution is stirred and heated at reflux temperature while a solutiton of 5.1 grams (0.02 mole) of 2-bromononanoyl chloride in 25 ml. of toluene is slowly added. The resultant solution is maintained at reflux temperature until the evolution of hydrogen chloride ceases. The solvent is removed by evaporation, and the residue is recrystallized from toluene. There is obtained 2-bromo-3'-chloro-4'-nitrononananilide, M.P. 139–140° C. Analysis shows 7.55% nitrogen as against a calculated value of 7.15% for $C_{15}H_{20}BrClN_2O_3$.

EXAMPLE 10

A suitable reaction vessel is charged with a solution of 8.6 grams (0.05 mole) of 3-chloro-4-nitroaniline in 150 ml. of a toluene-methylcyclohexane mixture. The solution is stirred and heated at reflux temperature while 10.1 grams (0.05 mole) of 10-undecenoyl chloride is slowly added. The resultant solution is maintained at reflux temperature until the evoluton of hydrogen chloride ceases. The solvent is removed by evaporatiton. The residue is filtered through Attapulgus clay, and a crystalline product forms upon standing. There is obtained 3'-chloro-4'-nitroundecen-10-anilide, M.P. 36–38° C. Analysis shows 10.3% chlorine as against a calculated value of 10.5% for $C_{17}H_{23}ClN_2O_3$.

EXAMPLE 11

A suitable reaction vessel is charged wtih a solution of 6.9 grams (0.04 mole) of 3-chloro-4-nitroaniline in 350 ml. of a toluene-methylcyclohexane mixture. The solution is stirred and heated at reflux temperature while 4.7 grams (0.04 mole) of cyclobutanecarbonyl chloride is slowly added. The resultant solution is maintained at reflux temperature until the evolution of hydrogen chloride ceases. The solution is then cooled, and the product which precipitates is recrystallized from toluene. There is obtained 3' - chloro - 4' - nitrocyclobutanecarboxanilide, M.P. 115–116° C. Analysis shows 14.1% chlorine as against a calculated value of 13.9% for $C_{11}H_{11}ClN_2O_3$.

EXAMPLE 12

A suitable reaction vessel is charged with a solution of 8.6 grams (0.05 mole) of 3-chloro-4-nitroaniline in 100 ml. of toluene. The solution is stirred and heated at reflux temperature while 6.7 grams (0.05 mole) of cyclopentanecarbonyl chloride is slowly added. The resultant solution is maintained at reflux temperature until the evolution of hydrogen chloride ceases. The solvent is removed by evaporation, and the residue is recrystallized from a toluene-methylcyclohexane mixture. There is obtained 3'-chloro-4'-nitrocyclopentanecarboxanilide, M.P. 135–136° C. Analysis shows 13.4% chlorine as against a calculated value of 13.2% for $C_{12}H_{13}ClN_2O_3$.

EXAMPLE 13

A suitable reaction vessel is charged with a solution of 8.6 grams (0.05 mole) of 3-chloro-4-nitroaniline in 200 ml. of a toluene-methylcyclohexane mixture. The solution is stirred and heated at reflux temperature while 8.1 grams (0.055 mole) of cyclohexanecarbonyl chloride is slowly added. The resultant solution is maintained at reflux temperature until the evolution of hydrogen chloride ceases. The solution is then cooled, and the product which precipitates is recrystallized from toluene. There is obtained 3' - chloro-4'-nitrocyclohexanecarboxanilide, M.P. 118–119° C. Analysis shows 12.7% chlorine as against a calculated value of 12.6% for $C_{13}H_{15}ClN_2O_3$.

EXAMPLE 14

A suitable reaction vessel is charged with a solution of 8.6 grams (0.05 mole) of 4-chloro-3-nitroaniline in 200 ml. of methylcyclohexane. The solution is stirred and heated at reflux temperature while 8.2 grams (0.055 mole) of heptanoyl chloride is slowly added. The resultant solution is maintained at reflux temperature until the evolution of hydrogen chloride ceases. The solution is then cooled, and the product which separates is isolated and filtered through Attapulgus clay. There is obtained 4'-chloro-3'-nitroheptananilide.

EXAMPLE 15

A suitable reaction vessel is charged with a solution of 8.6 grams (0.05 mole) of 4-chloro-3-nitroaniline in 200 ml. of methylcyclohexane. The solution is stirred and heated at reflux temperature while 10.5 grams (0.055 mole) of decanoyl chloride is slowly added. The resultant solution is maintained at reflux temperature until the evolution of hydrogen chloride ceases. The solution is then cooled, and the product which precipitates is recrystaliized from toluene. There is obtained 4'-chloro-3'-nitrodecananilide, M.P. 60–61° C. Analysis shows 10.9% chlorine as against a calculated value of 10.9% for $C_{16}H_{23}ClN_2O_3$.

EXAMPLE 16

A suitable reaction vessel is charged with a solution of 8.6 grams (0.05 mole) of 4-chloro-3-nitroaniline in 200

---

[1] Skellysolve B is an essentially n-hexane solvent having a boiling range of 140–160° F.

ml. of methylcyclohexane. The solution is stirred and heated at reflux temperature while 11.3 grams (0.055 mole) of undecanoyl chloride is slowly added. The resultant solution is maintained at reflux temperature until the evolution of hydrogen chloride ceases. The solution is then cooled, and the product which precipitates is recrystallized from methylcyclohexane. There is obtained 4'-chloro-3'-nitroundecananilide, M.P. 59–60° C. Analysis shows 10.6% chlorine as against a calculated value of 10.4% for $C_{17}H_{25}ClN_2O_3$.

EXAMPLE 17

A suitable reaction vessel is charged with a solution of 3.0 grams (0.015 mole) of 3-chloro-5-nitroaniline hydrochloride in 50 ml. of toluene. The solution is stirred and heated at reflux temperature while 2.7 grams (0.015 mole) of nonanoyl chloride is slowly added. The resultant solution is maintained at reflux temperature until the evolution of hydrogen chloride ceases. The solvent is removed by evaporation, and the residue is recrystallized from a methylcyclohexane-Skellysolve B mixture. There is obtained 3'-chloro-5'-nitrononananilide, M.P. 70–71° C. Analysis shows 11.7% chlorine as against a calculated value of 11.3% for $C_{15}H_{21}ClN_2O_3$.

EXAMPLE 18

A suitable reaction vessel is charged with a solution of 2.6 grams (0.01 mole) of 3-iodo-5-nitroaniline in 50 ml. of toluene. The solution is stirred and heated at reflux temperature while 2.0 grams (0.011 mole) of nonanoyl chloride is slowly added. The resultant solution is maintained at reflux temperature until the evolution of hydrogen chloride ceases. The solution is then cooled, and the product which precipitates is recrystallized from methylcyclohexane. There is obtained 3'-iodo-5'-nitrononananilide M.P. 89–90° C. Analysis shows 6.91% nitrogen as against a calculated value of 6.93% for $C_{15}H_{21}IN_2O_3$.

EXAMPLE 19

A suitable reaction vessel is charged with a solution of 3.5 grams (0.017 mole) of 3,5-dichloro-4-nitroaniline in 100 ml. of toluene. The solution is stirred and heated at reflux temperature while 3.5 grams (0.02 mole) of nonanoyl chloride is slowly added. The resultant solution is maintained at reflux temperature until the evolution of hydrogen chloride ceases. The solvent is removed by evaporation, and the residue is recrystallized from a toluene-Skellysolve C [2] mixture. There is obtained 3',5'-dichloro-4'-nitrononananilide, M.P. 101–102° C. Analysis shows 20.7% chlorine as against a calculated value of 20.4% for $C_{15}H_{20}Cl_2N_2O_3$.

EXAMPLE 20

A suitable reaction vessel is charged with a solution of 8.6 grams (0.05 mole) of 4-chloro-3-nitroaniline in 200 ml. of methylcyclohexane. The solution is stirred and heated at reflux temperature while 9.0 grams (0.055 mole) of octanoyl chloride is slowly added. The resultant solution is maintained at reflux temperature until the evolution of hydrogen chloride ceases. The solution is then cooled, and the product which separates is isolated and filtered through Attapulgus clay. There is obtained 4'-chloro-3'-nitrooctananilide.

EXAMPLE 21

A suitable reaction vessel is charged with a solution of 2.2 grams (0.01 mole) of 3-bromo-4-nitroaniline in 50 ml. of toluene. The solution is stirred and heated at reflux temperature while 2.0 grams (0.011 mole) of nonanoyl chloride is slowly added. The resultant solution is maintained at reflux temperature until the evolution of hydrogen chloride ceases. The solvent is removed by evaporation, and the residue is recrystallized from a methylcyclohexane-Skellysolve B mixture. There is obtained 3'-bromo-4'-nitrononananilide, M.P. 82–83° C. Analysis shows 22.6% bromine as against a calculated value of 22.4% for $C_{15}H_{21}BrN_2O_3$.

EXAMPLE 22

A suitable reaction vessel is charged with a solution of 1.6 grams (0.01 mole) of 4-fluoro-3-nitroaniline in 200 ml. of methylcyclohexane. The solution is stirred and heated at reflux temperature while 2.0 grams (0.011 mole) of nonanoyl chloride is slowly added. The resultant solution is maintained at reflux temperature until the evolution of hydrogen chloride ceases. The solution is then cooled, and the product which separates is isolated and filtered through Attapulgus clay. There is obtained 4'-fluoro-3'-nitrononananilide.

EXAMPLE 23

A suitable reaction vessel is charged with a solution of 8.6 grams (0.05 mole) of 3-chloro-4-nitroaniline and 5.1 grams (0.05 mole) of triethylamine in 300 ml. of ethyl ether. The solution is stirred and heated at reflux temperature while a solution of 8.8 grams (0.05 mole) of nonanoyl chloride in 25 ml. of ethyl ether is slowly added. The resultant solution is maintained at reflux temperature for about 4 hours. It is then cooled, and the solid triethylamine hydrochloride is filtered out. The solvent is removed by evaporation, and the residue is recrystallized from toluene. There is obtained 3'-chloro-4'-nitrononananilide, M.P. 79–80° C. Analysis shows 11.6% chlorine as against a calculated value of 11.3% for $C_{15}H_{21}ClN_2O_3$.

EXAMPLE 24

A suitable reaction vessel is charged with a solution of 4.4 grams (0.025) of 3-chloro-4-nitroaniline and 6.3 grams (0.027 mole) of neotridecanoyl chloride in 200 ml. of toluene. The solution is stirred and heated at reflux temperature while 2.6 grams (0.025 mole) of triethylamine is slowly added. The resultant solution is maintained at reflux temperature for about 4 hours. It is then cooled, and the solid triethylamine hydrochloride is filtered out. The solvent is removed by evaporation, and the residue is filtered through Attapulgus clay. There is obtained 3' - chloro - 2,2-dimethyl-4'-nitroundecananilide, $n_D^{25}$=1.5286. Analysis shows 9.92% chlorine as against a calculated value of 9.61% for $C_{19}H_{29}ClN_2O_3$.

EXAMPLE 25

A suitable reaction vessel is charged with a solution of 8.6 grams (0.05 mole) of 3-chloro-4-nitroaniline and 5.1 grams (0.055 mole) of triethylamine in 200 ml. of ethyl ether. The solution is stirred and heated at reflux temperature while a solution of 6.0 grams (0.05 mole) of valeryl chloride in 30 ml. of ethyl ether is slowly added. The resultant solution is maintained at reflux temperature for about 2 hours. It is then cooled, and the solid triethylamine hydrochloride is filtered out. The solvent is removed by evaporation, and the residue is recrystallized from a toluene-Skellysolve B mixture. There is obtained 3'-chloro-4'-nitropentananilide, M.P. 63–64° C. Analysis shows 14.0% chlorine as against a calculated value of 13.8% for $C_{11}H_{13}ClN_2O_3$.

EXAMPLE 26

A suitable reaction vessel is charged with a solution of 8.6 grams (0.005 mole) of 3-chloro-4-nitroaniline and 5.1 grams (0.05 mole) of triethylamine in 200 ml. of a toluene-methylcyclohexane mixture. The solution is stirred and heated at about 60° C. while a solution of 11.0 grams (0.05 mole) of dodecanoyl chloride in 20 ml. of toluene is slowly added. The resultant solution is maintained at said temperature for about 2 hours, and it is then filtered hot to remove the solid triethylamine hydrochloride. The solvent is removed by evaporation, and the

---

[2] Skellysolve C is an essentially n-heptane solvent having a boiling range of 190–212° F.

residue is recrystallized from a toluene-Skellysolve B mixture. There is obtained 3'-chloro-4'-nitrododecananilide, M.P. 70–71° C. Analysis shows 10.2% chlorine as against a calculated value of 9.99% for $C_{18}H_{27}ClN_2O_3$.

EXAMPLE 27

A suitable reaction vessel is charged with a solution of 17.2 grams (0.1 mole) of 4-chloro-3-nitroaniline and 21 grams of triethylamine in 200 ml. of ethyl ether. The solution is stirred and heated at reflux temperature while a solution of 17.6 grams (0.1 mole) of nonanoyl chloride in 25 ml. of ethyl ether is slowly added. The resultant solution is maintained at reflux temperature for about 2 hours. It is then cooled, and the solid triethylamine hydrochloride is filtered out. The solvent is removed by evaporation, and the heated residue is filtered through Attapulgus clay. There is obtained 4'-chloro-3'-nitrononananilide, M.P. 39–40° C. Analysis shows 11.0% chlorine as against a calculated value of 11.3% for $C_{15}H_{21}ClN_2O_3$.

EXAMPLE 28

A suitable reaction vessel is charged with a solution of 8.6 grams (0.05 mole) of 3-chloro-4-nitroaniline in 200 ml. of a toluene-methylcyclohexane mixture. The solution is stirred and heated at reflux temperature while 8.7 grams (0.055 mole) of 2-nonenoyl chloride is slowly added. The resultant solution is maintained at reflux temperature until the evolution of hydrogen chloride ceases. The solvent is removed by evaporation to yield 3'-chloro-4'-nitrononen-2-anilide.

EXAMPLE 29

A suitable reaction vessel is charged with a solution of 4.5 grams (0.014 mole) of 3'-chloro-4'-nitrononen-2-anilide in 100 ml. of carbon tetrachloride. The solution is stirred at a temperature of about 0–5° C. while a solution of 2.3 grams (0.014 mole) of bromine in 25 ml. of carbon tetrachloride is slowly added. The reaction mixture is maintained at about 0–5° C. for six hours and then at reflux temperature for about 30 minutes. The resultant mixture is cooled and filtered, and solvent is removed from the filtrate by evaporation to yield 2,3-dibromo-3'-chloro-4'-nitrononananilide.

EXAMPLE 30

A suitable reaction vessel is charged with a solution of 1.4 grams (0.003 mole) of 2,3-dibromo-3'-chloro-4'-nitrononananilide and 0.6 grams (0.006 mole) of potassium acetate in 50 ml. of ethanol. The solution is maintained at reflux temperature for about two hours. It is then filtered and the solvent is removed from the filtrate by evaporation. The residue is taken up in ether and washed with water. The ether solution is then dried over sodium sulfate, and the solvent is removed by evaporation. There is obtained 2-bromo-3'-chloro-4'-nitrononen-2-anilide.

As pointed out above, the compounds of this invention have been found to possess useful and unexpected microbiological activity. In this regard, such compounds have been found to be particularly effective in the control of bacteria. To demonstrate the aforesaid control, the following test procedure was employed. Stock solutions were prepared by dissolving 100 mg. of the compound to be tested in 10 ml. of acetone, alcohol, or other solvents. These stock solutions were serially diluted by pipetting 2 ml. of the stock solution into 18 ml. of sterile nutrient agar to obtain a $1\times10^3$ dilution and continuing this procedure in the same manner to obtain further dilutions up to $1\times10^6$. The agar was poured into Petri dishes, allowed to harden, and was then spot inoculated with one drop of a cell suspension of *Staphylococcus aureus*. The suspension was prepared by suspending the growth from a 24 hour nutrient agar slant culture in 10 ml. of distilled water. The inoculated samples were incubated at 37° C. for 48 hours and were thereafter examined to determine whether or not bacterial growth had occurred.

When the above test was conducted with various halonitroanilides of this invention, it was found that representative compounds such as those of Examples 1, 6, 9, 15, 19 and 22 showed no growth of bacteria at a dilution of at least one part per one million parts of diluent. Similar results were obtained with other and different compounds of this invention.

In order to demonstrate that the aforesaid microbiological activity of this invention is unexpected, tests were also run with closely related compounds including various homologs and chain and position isomers. The closely related compounds tested include:

3'-chloro-4'-nitroacetanilide
3'-chloro-4'-nitropropionanilide
3'-chloro-4'-nitrobutyranilide
3'-chloro-4'-nitroisobutyranilide
3'-chloro-4'-nitroisovaleranilide
3'-chloro-2-methyl-4'-nitrobutyranilide
3'-chloro-4'-nitrotrimethylacetanilide
3'-chloro-2,2-dimethyl-4'-nitrovaleranilide
3'-chloro-N-methyl-4'-nitrononananilide
3'-chloro-2,2-dimethyl-4'-nitrooctananilide
3'-chloro-4'-nitromyristanilide
3'-chloro-4'-nitrobenzanilide
3,3',4-trichloro-4'-nitrobenzanilide
3'-chloro-4'-nitrophenylacetanilide
3'-chloro-4'-nitro-3-phenylpropionanilide
3'-chloro-2(2,4-dichlorophenoxy)-4'-nitroacetanilide
3'-chloro-2-(2,4,5-trichlorophenoxy)-4'-nitroacetanilide
4'-chloro-3'-nitroacetanilide
4'-chloro-3'-nitropropionanilide
2'-chloro-4'-nitrononananilide
2'-bromo-4'-nitrononananilide
4'-chloro-2'-nitrononananilide
2'-chloro-5'-nitrononananilide
3',5'-dichloro-4'-nitroacetanilide
2',5'-dichloro-4'-nitrononananilide
2',6'-dichloro-4'-nitrononananilide
4',5'-dichloro-2'-nitrononananilide
5'-chloro-2'-methyl-4'-nitrononananilide
3-carbomethoxy-3'-chloro-4'-nitropropionanilide
3'-chloro-4'-nitrooleanilide All of the above compounds were found to be either completely inactive or to control the growth of bacteria only at concentrations at least 10 times greater than the effective concentrations of the most closely related counterparts of this invention.

It should be recognized that while all of the compounds of this invention are useful for the purposes described herein, a particularly preferred group of such compounds are those of the formula

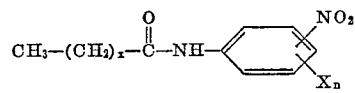

wherein: $x$ is an integer from 4 to 10 carbon atoms inclusive; $n$ is an integer from 1 to 2; X is halogen; and the aniline nucleus is free of ortho substituents.

This preferred group of compounds has been found to display outstanding effectiveness in the above described tests.

While the invention has been described herein with regard to certain specific embodiments, it is not so limited. It is to be understood that variations and modifications thereof may be made by those skilled in the art without departing from the spirit and scope of the invention.

I claim:
1. A compound of the formula

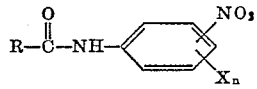

wherein R is alkyl of from 10 to 12 carbon atoms and the carbon atom of R, which is directly attached to the carbonyl group of the anilide, is a tertiary carbon atom; $n$ is an integer from 1 to 2, X is halogen, and the aniline nucleus is free of ortho substituents.

2. 3'-chloro-2,2-dimethyl-4'-nitroundecananilide.

References Cited

UNITED STATES PATENTS

| 3,246,975 | 4/1966 | Hopkins et al. | 260—557 X |
| 3,332,768 | 7/1967 | Freund et al. | 260—562 X |
| 3,108,038 | 10/1963 | Fielding et al. | 260—56 X |

OTHER REFERENCES

Yale, H. L. Journal of Medicinal and Pharm. Chem., vol. 1, No. 2 (1959), p. 130, "The Trifluoromethyl Group in Medicinal Chem."

NICHOLAS S. RIZZO, Primary Examiner.

F. A. MIKA, Assistant Examiner.

U.S. Cl. X.R.

260—562; 167—22, 65